United States Patent
Ball et al.

(10) Patent No.: US 12,436,921 B2
(45) Date of Patent: Oct. 7, 2025

(54) FILE SHARING ALIASING SERVICE

(71) Applicant: Microsoft Technology Licensing, LLC, Redmond, WA (US)

(72) Inventors: Steven James Ball, Redmond, WA (US); Eugene Lin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 16/579,613

(22) Filed: Sep. 23, 2019

(65) Prior Publication Data

US 2021/0089500 A1   Mar. 25, 2021

(51) Int. Cl.
*G06F 16/176* (2019.01)
*G06F 16/182* (2019.01)
*H04L 29/08* (2006.01)
*H04L 67/06* (2022.01)

(52) U.S. Cl.
CPC .......... *G06F 16/176* (2019.01); *G06F 16/183* (2019.01); *H04L 67/06* (2013.01)

(58) Field of Classification Search
CPC ..... G06F 16/176; G06F 16/183; H04L 67/06; G06Q 10/10
See application file for complete search history.

(56) References Cited

U.S. PATENT DOCUMENTS

| 2012/0303813 A1* | 11/2012 | Bell ................... H04L 67/1097 709/226 |
| 2013/0067343 A1 | 3/2013 | Groves et al. |
| 2014/0068401 A1* | 3/2014 | Kirigin ............... G06F 16/9535 715/205 |
| 2014/0380420 A1* | 12/2014 | Wang ..................... G06F 16/51 726/4 |
| 2015/0253946 A1 | 9/2015 | Chandrasekaran |
| 2017/0302671 A1* | 10/2017 | Rivelli .................. H04L 51/224 |

FOREIGN PATENT DOCUMENTS

WO   2010039460 A2   4/2010

OTHER PUBLICATIONS

"International Search Report and Written Opinion Issued in PCT Application No. PCT/US20/037973", Mailed Date: Sep. 10, 2020, 12 Pages.

* cited by examiner

*Primary Examiner* — Ajay M Bhatia
*Assistant Examiner* — Chongsuh Park
(74) *Attorney, Agent, or Firm* — Wade IP Law PLLC (57) ABSTRACT

A file sharing service having an aliasing service for use with a file sharing program is disclosed. The aliasing service receives a file sharing invitation from a file sender account of the file sharing program. The file sharing invitation is addressed to a first contact channel of a set of contact channels. A second contact channel is determined from the set of contact channels based on the file sharing account. The file sharing invitation is sent to the second contact channel, in which the first contact channel is different than the second contact channel.

20 Claims, 4 Drawing Sheets

FILE SHARING ALIASING SERVICE

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include file sharing services implemented as a file hosting service, a cloud storage service, an online file storage provider, or a cyberlocker as an internet hosting service designed to host and share digital files. For example, a user can upload files that could be accessed over the internet via multiple devices or other users with an invitation.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Computer application providers, such as cloud service providers, can provide for the secure sharing of files between users such as collaborators. Sharing files in a secure way, such as via file sharing services can imply the person sharing the file has knowledge of the precise contact information about the person or group with whom they wish to share. Users of file sharing services, however, increasingly have more than one digital address or alias (including work email address, home email address, school email address, phone number, gamer tag) so this puts a burden on the file sender to know the complex list of addresses for their contacts. This disclosure provides a more robust and intelligent file sharing service with aliasing service to offer the file sharer an appropriate receiving context for the file recipient.

The disclosure is directed to a file sharing service having an aliasing service for use with a file sharing program. A file sender, with a file sharing account can upload files to be shared with a file recipient on the file sharing program. In one example, the file sharing service provides a file sharing invitation to the file recipient informing the recipient of a file to be shared on the file sharing program and providing controls to access the file. The aliasing service receives the file sharing invitation from the file sender account. The file sharing invitation is addressed to a first contact channel of a plurality of contact channels such as via a first alias (e.g. a first e-mail address, which may be, in one example, the only alias of the file recipient of which the file sender is aware). The file recipient may have more than one alias, such as a plurality of aliases that correspond with the plurality of contact channels, and the first alias may not be one with which the file recipient would wish to access the file. The aliasing service can determine a second contact channel of the plurality of contact channels based on the file sharing account. The file sharing invitation is sent to the second contact channel, in which the first contact channel is different than the second contact channel. The file recipient can access the file from the second contact channel in a way that can be both secure and compliant with the data-sharing requirements and expectations of the sender.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
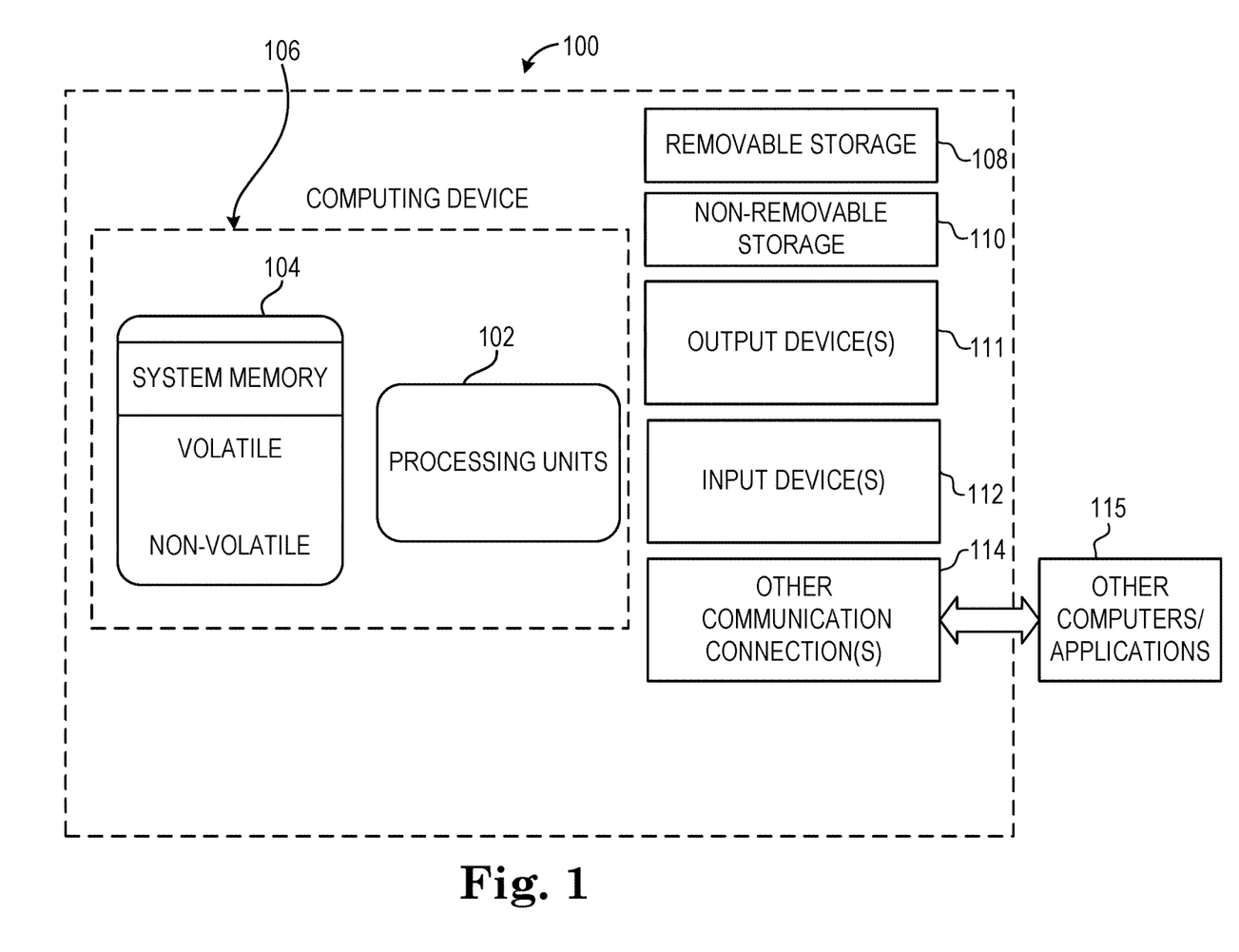
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums computer readable storage devices storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Cloud computing services can include file sharing services. File sharing is the practice of distributing or providing access to digital files, or files, such as computer programs, electronic documents or electronic books, digital folders, digital objects, and media including audio, images and video. File sharing between users may be achieved in a number of ways. Common methods of storage, transmission and dispersion of files can include centralized or distributed servers on computer networks. For example, file sharing services may implement automated file transfers by updating files from a dedicated sharing directory on networked devices. One example model of a file sharing service can be implemented as a cloud-based application and may include file syncing features. In some instances, files placed in a digital folder can be accessible through a website and mobile application, and can be easily shared with other users for viewing or collaboration. File sharing services have become popular via consumer-oriented file hosting services. File sharing services can also be include included in collaborative platforms that may integrate with content creation services, such as word processor programs, and may be incorporated in content management or document management services.

Figure 2:
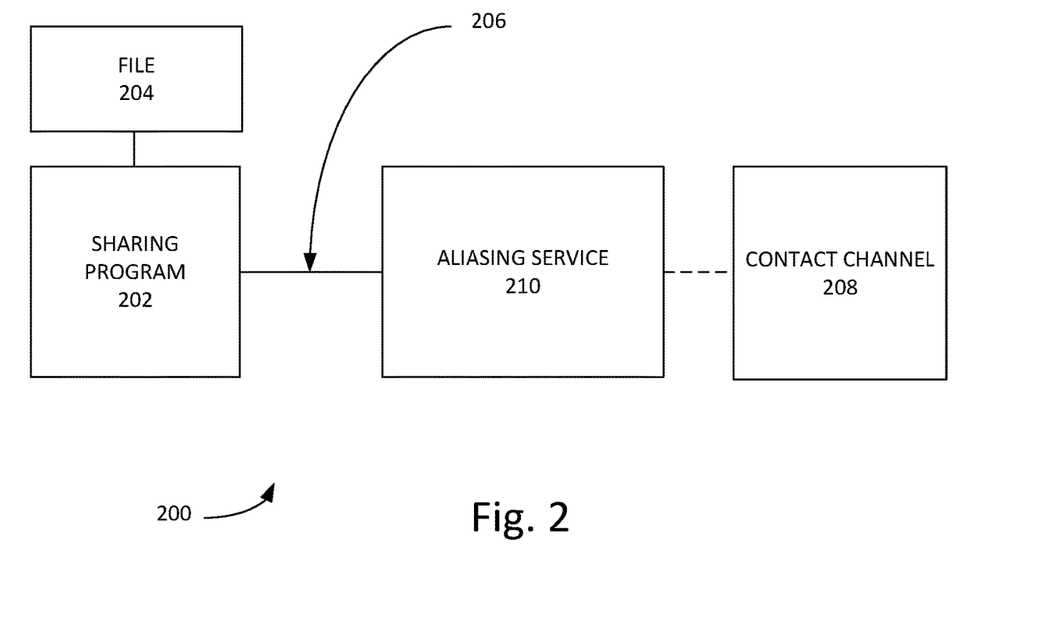
FIG. 2 is a schematic diagram illustrating an example of a file sharing service, such as a cloud-based file sharing service for use in a cloud computing environment.

FIG. 2 illustrates an example file sharing service 200 that can be implemented as a cloud-based file sharing service. File sharing service 200 can be accessed by a file sharer, or file sender, that applies a sharing program 202 to upload a file 204 to be shared, such as distributed to others or made available to others including for collaboration or consumption. The file sender may access the file sharing service 200 via a plurality of mechanisms. For example, the file sharing service 200 may be a subscription cloud-service to which the file sender is subscribed and has an account with the file sharing service 200. In one example, the file sender may provide contact information to the file sharing service 200 to identify the file sender. For instance, the contact information may include a username, password, and contact channel information such as an alias associated with an account of the file sender, which can include an e-mail address, telephone number, flat namespace name such as a gamer tag or telecommunication account name. The file sharer can allow others, such as a file recipient, to access the file via a file sharing invitation 206 provided to a contact channel 208 of the file recipient. For example, the file sharing invitation 206 can provide notice that the file sender has placed the file 204 in the sharing program 202, and the file sharing invitation 206 may include a link or control that provides the file recipient with access to the file 204 or to the file sharing program 202 to access the file 204.

In one example, the file recipient may access the file 204 or the file sharing program 202 directly through the file sharing invitation 206 provided to the contact channel 208. Examples of a contact channel 208 can include an e-mail program, a telephone, a telecommunications application, a messaging application, a video game or interactive media application. The contact channel 208 can be accessible via an alias, which can include an e-mail address, phone number, telecommunications application name, and a gamer tag. In many examples, a single user may include multiple aliases including multiple aliases for a type of contact channel such as work e-mail address and a personal e-mail address, additional e-mail addresses, and multiple telephone numbers.

In an example of file sharing via a typical file sharing service, a file sender must be precise about the alias of the file recipient, and a file sharing invitation is sent only to the contact channel corresponding with the alias. For example, a file sharer may choose to share a business proposal as a digital file via the file sharing program to a file recipient, but the file sharer can only remember the file recipient's gamer tag, the file sharing invitation will be provided to the video game system. Some email applications also auto-fill a file recipient's email address based upon most recently used, which means the file sender can sometimes inadvertently send to the wrong contact channel for the right file recipient. A typical file sharing service implies the file sender has knowledge of the precise contact information about the file recipient. Users of file sharing services, however, increasingly have more than one alias, and this puts a burden on the file sender to know the complex list of addresses for the file recipients.

The file sharing service 200 includes an aliasing service 210 to determine an appropriate alias for the file recipient and to provide the file invitation 206 to the contact channel 208 corresponding with the appropriate alias. An appropriate alias can be determined from a plurality of proven aliases corresponding with the file recipient. For example, an appropriate alias can include an alias that corresponds with an alias the file sender has used to access the file sharing service 200, an alias that the file recipient has designated as an alias to receive the file sharing invitation 206, an alias based on previous interactions between the file sender and the file recipient, an alias based on the nature of the file 204 uploaded to the file sharing program 202, and an appropriate contact channel, such as contact channel 208, that corresponds with the appropriate alias. While the file sharer may designate an alias of the file recipient to receive the file sharing invitation 206, such as an alias selected by the file sharer or selected alias, or first alias, the appropriate alias is an alias determined by the aliasing service 210, or second alias. The file sharer, via the file sharing program, may specify a first alias corresponding with a contact channel of the file recipient to receive the file sharing invitation 206, and the aliasing service 210 selects an appropriate alias, or second alias, of the file recipient and provides the file sharing invitation 206 to the contact channel 208 corresponding with the second alias. In one example, the first alias is different than the second alias, and the contact channel corresponding with the first alias is different the contact channel corresponding with the second alias.

The aliasing service 210 can provide the file sharing invitation 206 to the contact channel 208 corresponding with the second alias via a number of mechanisms. In one example, the aliasing service 210 can automatically provide the file sharing invitation 206 to contact channel 208 corresponding with the second alias. The file recipient receives the file sharing invitation 206 in the contact channel 208 corresponding with the second alias. In another example, the aliasing service 210 determines the appropriate alias and provides the file sharing invitation 206 to the first alias with controls to allow the file recipient to open the file sharing invitation 206 in the contact channel corresponding with the second alias. The file sharing invitation can include a suggestion or a hint that the user has to confirm to prove ownership to the file recipient to open the file sharing invitation in the contact channel corresponding with the second alias as well as controls to open the file sharing invitation in the contact channel corresponding with the second alias. In another example, the aliasing service 210 determines the appropriate alias and provides the file sharing invitation 206 to the first alias or the second alias with controls to allow the file recipient to open the file sharing invitation 206 in the contact channel corresponding with the second alias or a third alias, in which the third alias is different than the second alias. For instance, the aliasing service can provide the file invitation 206 to the contact channel corresponding with the first alias with a suggestion to open the file sharing invitation in the contact channel corresponding with the second alias, but with controls to allow the file recipient to open the file sharing program in a contact channel corresponding with one of the plurality of aliases of the file recipient, such as one of the plurality of aliases of which the aliasing service 210 is aware.

In one example, the file sharing service 200 and aliasing service 210 can be implemented as a computer program to run on a computing device, such as computing device 100. For example, the file sharing service 200 can be implemented as a cloud-based file sharing service. In this example, the file sharing service 200 can include a cloud-based file sharing program and the aliasing service can be implemented as a program running on the file recipient side. The plurality of aliases can be stored at the file recipient side. In another example, the aliasing service can be implemented as a cloud-based program with the plurality of aliases stored in a central server or disturbed server, which may include pluralities of aliases of other users.

Figure 3:
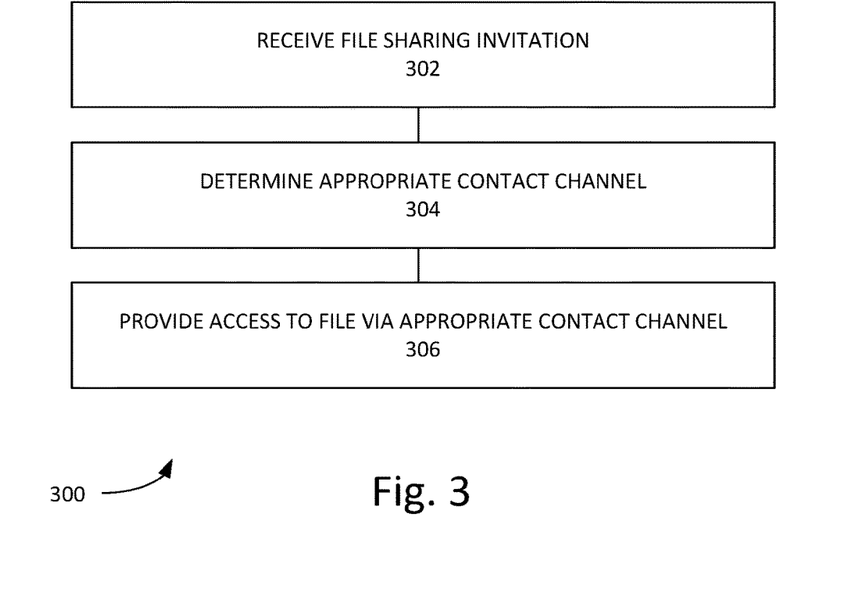
FIG. 3 is a block diagram illustrating an example method of the file sharing service of FIG. 2.

FIG. 3 illustrates an example method 300 of the file sharing service 200. In one example, the method 300 can be implemented as a computer program to run on a computing device, such as computing device 100. For example, the method 300 can be implemented as a set of computer readable instructions stored in a memory device, which is not a propagating signal, such as memory 104, to cause a processor, such as processor 102, to perform the method 300. In the example method 300, a file sharing invitation is received for a file recipient to access the file 204 in sharing program 202, at 302. The file sharing invitation received at 302 can be provided in response to a file sender uploading file 204 to sharing program 202 and providing an alias of the file recipient. The alias can be one of a plurality of aliases that correspond with a plurality of contact channels of the file recipient. An appropriate contact channel is determined from a plurality of contact channels for the file recipient, at 304. In one example, the appropriate contact channel can be determined based on a comparison of the file sender alias (which may correspond with the file sharing service account of the file sender) to the plurality of aliases of the file recipient. In another example, the appropriate contact channel can be determined by the file recipient selection. The appropriate contact channel can be different from the contact channel corresponding with the alias for the file recipient provided by the file sender. Access to the file 204 in sharing program 202 is provided to the appropriate contact channel, at 306. For example, the contact channel corresponding with the alias selected by the file recipient can be a first contact channel and the appropriate contact channel to which the file sharing invitation is provided can be a second contact channel in which the first contact channel is different than the second contact channel.

Figure 4:
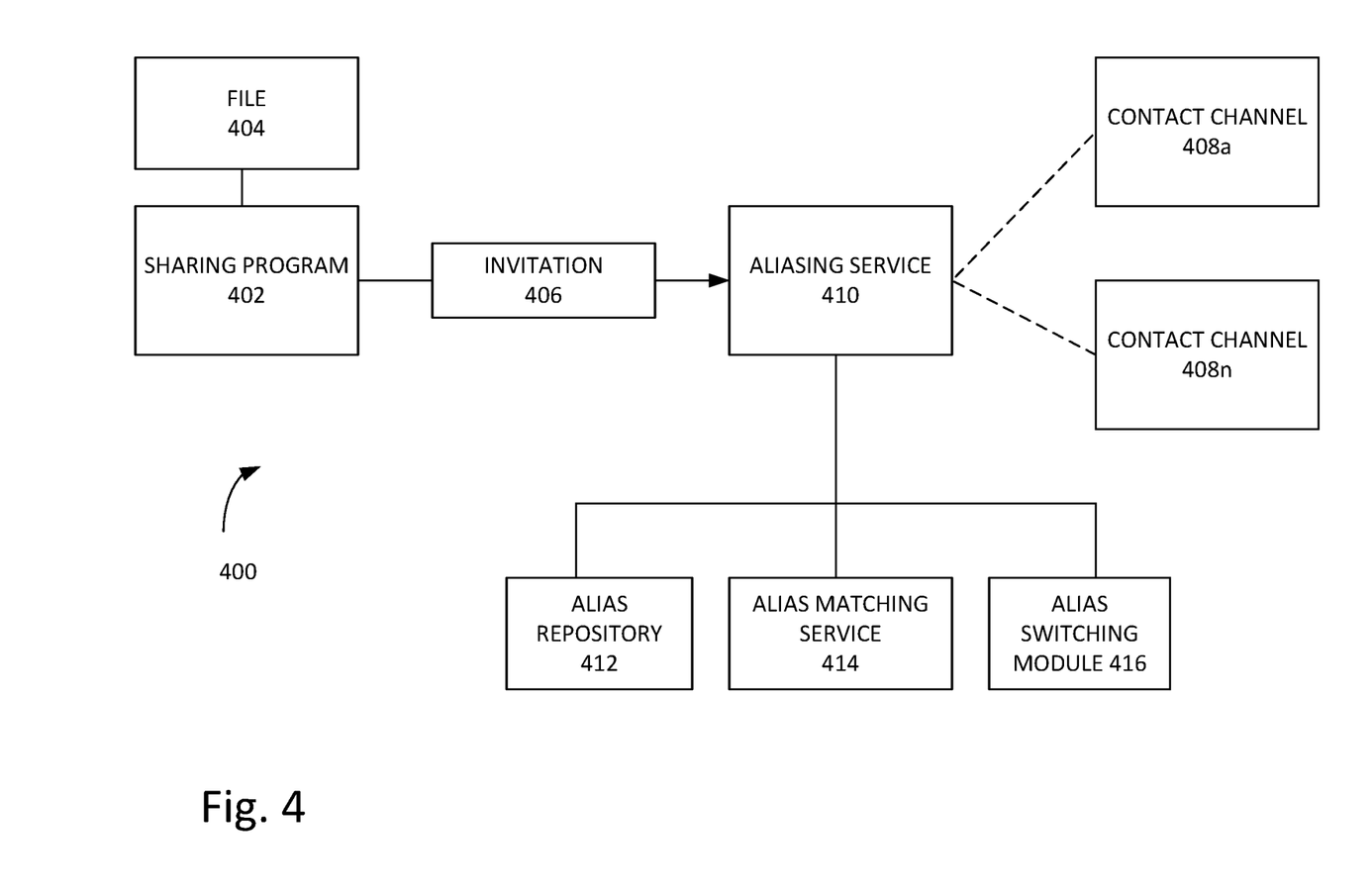
FIG. 4 is a schematic diagram illustrating an example file sharing service constructed in accordance with the file sharing service of FIG. 2.

FIG. 4 illustrates a file sharing service 400 that is an example of the file sharing service 200. The file sharing service 400 includes a file sharing program 402, which can correspond with the file sharing program 202, and an aliasing service 410, which can correspond with the aliasing service 210. In an example, a file sender can subscribe to the file sharing service 400 and include an account with the file sharing service 400. The file sharing service 400 can include a stand-alone file sharing service 400 or be incorporated into another service such as a content creation or content collaboration platform. In another example, the file sender can access the file sharing service 400 via a guest account and not include a subscription. The file sender provides account information to the file sharing service 400, which may include a user name, name of the file sender, and an alias of the file sender. The file sender can provide a file 404, which can correspond with file 204, to the file sharing program 402, such as upload a file to a cloud-based file storage. The file sender can designate a file recipient, which can include one or more file recipients, to access the file 404 on the file sharing program 404. For example, the file sender can provide an alias of the file recipient to receive a file sharing invitation 406, which can correspond with file sharing invitation 206, to the aliasing service 410. The file recipient can include a plurality of aliases that each corresponds with a contact channel, such as contact channels 408*a*-408*n*. The aliasing service 410 can determine, based on the alias of the file sender and the file recipient, an appropriate contact channel 408*a*-408*n* to provide the file sharing invitation 406, which can be different than the contact channel corresponding with the alias provided by the file sender. The file sharing invitation 406 can include controls, such as a user interface, to allow the file recipient to access the file sharing service 400 and the file 404. Upon receipt of the file sharing invitation 406, for example, the file recipient can apply the controls on the file sharing invitation 406 and have access to the file sharing service 400 and the file 404. The file sharing service 400 may provide a notification to the file sender such as that the file recipient has access the file sharing invitation 406 or the file 404. The file recipient may access the file 404 in a manner designated by the file sharing service 400, such as the file recipient may have read or write or download permissions.

The aliasing service 410 can include a alias repository 412, an alias matching module 414, and an alias switching module 416 to determine the appropriate contact channel 408*a*-408*n* that is to receive a file sharing invitation 406. The alias repository 412 can include a plurality of aliases that are associated with the file recipient. For example, the alias repository 412 can include a record that comprises a plurality of aliases for the file recipient. The record of aliases could be populated based on aliases provided by the file recipient and aliases collected from other services of the file recipient. The record could be further categorized by aliases corresponding with contact channel types, such as e-mail accounts and gamer accounts (that may correspond with gamer tags) or other flat namespace alias and can include subtypes such as work e-mail accounts and school e-mail accounts. The record could also include categories of domains or toplevel domain names such as for e-mail addresses. In one example, the alias repository can include a database of a plurality of records each corresponding with a different user of the file sharing service 400. In this example, the alias repository could resolve the appropriate user record via the alias provided by the file sender, or the first alias, in which the record includes a plurality of user aliases. The record in the alias repository 412 can be accessed by the first alias, i.e., the alias provided by the file sender, and the aliasing service 410 is able to determine the plurality of aliases for the user corresponding with the first alias.

The alias matching module 414 determines an appropriate contact channel from the plurality of contact channels 408a-408n corresponding with the aliases on the record in the alias repository 412. The alias matching module 414 can receive the file sharing invitation 406 as well as account information or the alias of the file sender and the record of the file recipient from the alias repository 412 to determine the appropriate contact channel to receive the file sharing invitation 406. The alias matching module 414 can use information determined from the file sender account and the resolved user record from the first alias. The alias matching module can determine the appropriate alias, or second alias, based on information from the first alias and the file sender information such as the alias type of the file sender account (whether the alias corresponds with an e-mail address, a gamer tag, a phone number), alias domain (such as, in the case of an alias type being an e-mail address, the domain of the e-mail address such as [account name]@[domain]) or toplevel domain name of an alias type (such as, in the case of an alias type being an e-mail address, the top level of the domain of the e-mail address such as [account name]@ [example].[toplevel domain name]), and from the nature of the file such as determined from a hash of the file.

In one example, the file sender has an account with the file sharing service 400 that is based on a particular alias type that is an e-mail address and the e-mail address includes a particular domain such as @[enterprise] suggesting a work e-mail account. The first alias, or alias of the file recipient as provided by the file sender for the file sharing invitation may be an e-mail address with a particular domain as @[free web-based e-mail service] suggesting a personal e-mail account. The resolved record from the alias repository 412 comprises a plurality of alias for the file recipient including a work e-mail address. The alias matching module 414 may determine, such as via machine learning or based on a set of rules, that if the file sender associated with a work e-mail the alias, corresponding with the appropriate contact channel, or second alias, should also be a work e-mail account. In some examples, the alias matching module 414 may access a social media account to determine the appropriate contact channel.

In another example, the file sender has an account with the file sharing service 400 that is based on a school e-mail address as determined by a .edu toplevel domain name. The file sender uploads a file 404 to the file sharing program 402 and designates a gamer tag for the file recipient as the first alias. The resolved record from the alias repository indicates that among the plurality of e-mail addresses for the file recipient is an e-mail address with a .edu toplevel domain name. The alias matching module 414 determines that the appropriate contact channel of the plurality of contact channels for the file recipient corresponds with the e-mail address with the .edu toplevel domain name, or second alias.

In still another example, the file sender has an account with the file sharing service 400 that is based on a particular domain of an e-mail address, or account domain. The file sender uploads a file 404 to the file sharing program 402 and designates a first alias for the file recipient. The resolved record from the alias repository indicates that among the plurality of aliases for the file recipient is an e-mail address with the same domain name as the account domain. The alias matching module 414 determines that the appropriate contact channel of the plurality of contact channels for the file recipient corresponds with the e-mail address with the account domain, or second alias. The file sharing invitation 406 is sent to the contact channel corresponding with second alias.

The example file sharing service 400 also includes an alias switching module 416. In one example, the alias switching module can change the first alias to the second alias and send the file sharing invitation 406 to the contact channel corresponding with the second alias rather than the contact channel corresponding with the first alias. In this example, the aliasing service 410 can automatically send the file sharing invitation to the appropriate contact channel of the plurality of contact channels 408a-408n corresponding with the second alias. In some examples, the second alias can be displayed to the file sender, or a note that the first alias has been changed to a second alias without disclosing the second alias, for confirmation and authorization by the file sender. In another example, the aliasing service 400 provides the file sharing invitation 406 to the first alias, but the alias switching module 416 adds controls to the sending invitation 406 to allow the file recipient to open the file sharing invitation 406 in the control channel corresponding 408a-408n with the second alias. In still another example, the aliasing service 400 provides the file sharing invitation 406 to the first alias, but the alias switching module 416 adds controls to the sending invitation 406 to allow the file recipient to open the file sharing invitation 406 in one of a plurality of the control channel corresponding 408a-408n, such as a control channel corresponding with a third alias but with a suggestion to open the file sharing invitation in the control channel of the second alias. In these examples, the aliasing service 410 can send the file sharing invitation 406 to the appropriate contact channel of the plurality of contact channels 408a-408n corresponding with the second alias via file recipient interaction.

In some examples, the alias switching module 416 can provide a notification to the file sender that the file recipient has received or opened the file sharing invitation 406. In one example, a notification can be provided to the file sharing program 402 or to a contact channel associated with the file sender account, that the file recipient has changed the contact channel 408a-408n. In some instances, the alias of the appropriate contact channel can be provided to the file sender for confirmation of receipt and to update the file sender of a preferred alias of the file recipient for the nature of the file 404.

The alias switching module 416 can provide the file sharing invitation 406 with resources—e.g., HTML, JavaScript, CSS, XML, and images—to implement a particular high-level feature of the user interface. The user interface can include controls that allow the file recipient to select one of the plurality of aliases via a click of a pointing device. The user interface may include additional controls that permit the file recipient to control receipts to the file or to send a preprogrammed message to update the file sender of the preferred alias or the appropriate contact channel. The user interface may include additional features such as the ability to input a custom message with a receipt to the file sender or to enter an additional alias corresponding with a contact channel not included in the plurality of contact channels 408a-408n.

Figure 5:
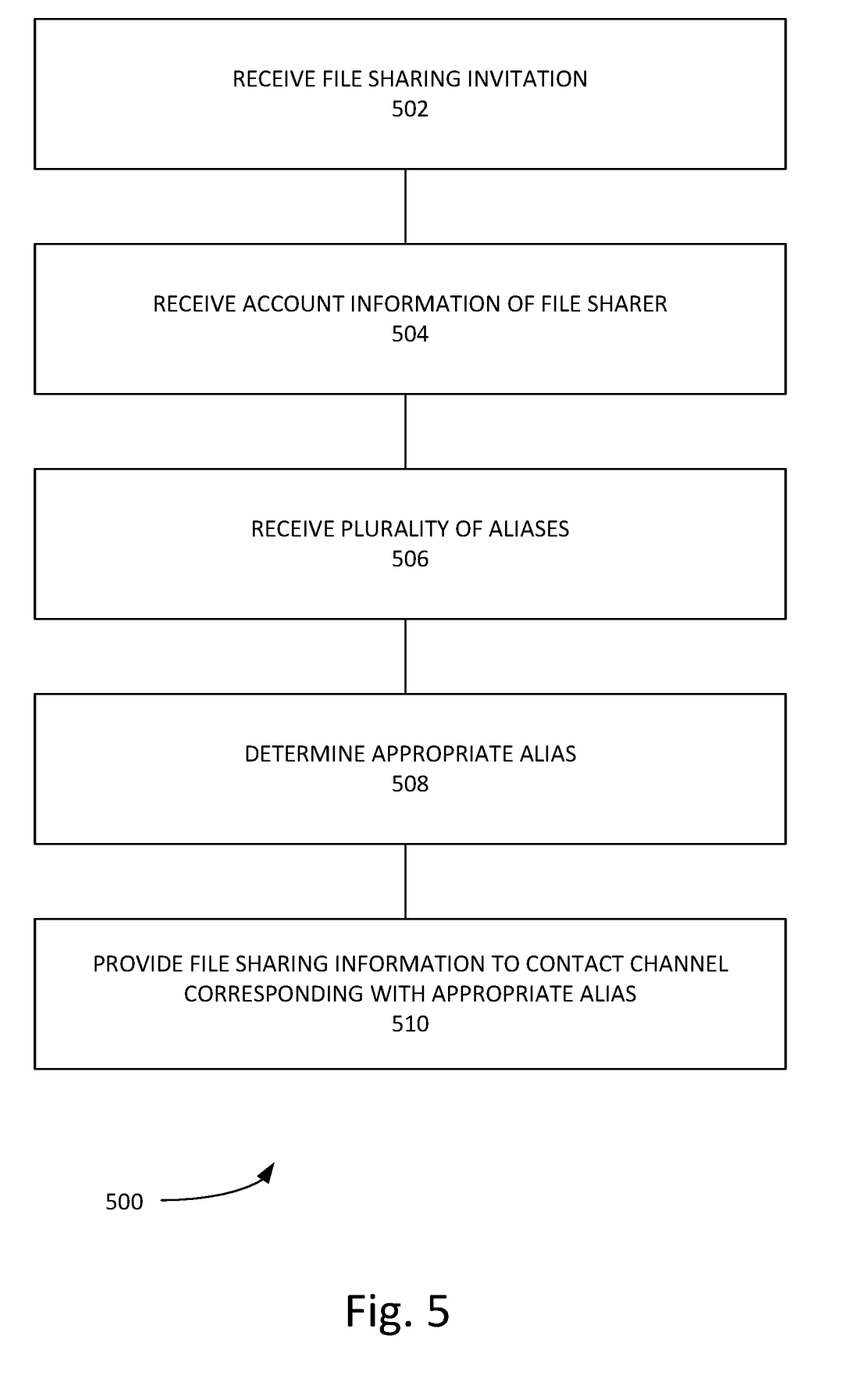
FIG. 5 is a block diagram illustrating an example method of the file sharing service of FIG. 4.

FIG. 5 illustrates an example method 500 that can be used with the file sharing services 200, 400 and method 300. In one example, the method 500 can be implemented as a computer program to run on a computing device, such as computing device 100. For example, the method 500 can be implemented as a set of computer readable instructions stored in a memory device, which is not a propagating signal, such as memory 104, to cause a processor, such as processor 102, to perform the method 300. In the example method 500, a file sharing invitation, such as file sharing invitation 406, is received at 502. Information, such as metadata regarding the account of the file sender that generated the file sharing invitation 406, is received at 504. Alias information, such as a record of a plurality of aliases associated with the file recipient, is received at 506. A determination is made as to an appropriate alias of the plurality of aliases to which to provide the file sharing invitation, at 508. The file sharing invitation is provided to the appropriate alias at 510. In one example, the file sharing invitation is automatically provided to the appropriate alias. In another example, the file sharing invitation made available to the appropriate alias via controls in the file sharing invitation.

The example systems 200, 400 and methods 300, 500 can be implemented to include a combination of one or more hardware devices and computer programs for controlling a system, such as a computing system having a processor and memory, to perform methods 300, 500. For instance, systems 200, 400 and methods 300, 500 can be implemented as a computer readable medium or computer readable storage device having set of executable instructions for controlling the processor to perform the methods 300, 500. The systems 200, 400 and methods 300, 500 can be included as a service in a cloud environment. In one example, the systems 200, 400, and methods 300, 500 can be implemented as a cloud service over a computer network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for use with a file sharing program, the method comprising:
receiving a file sharing invitation for a recipient from a file sharing account of a file sender, the file sharing account associated with the file sharing program, the file sharing invitation associated with a file uploaded to the file sharing program to be accessed by the recipient via the file sharing invitation, the file sharing invitation indicating that an alias, which identifies the recipient to which the file is to be sent, is a first alias that identifies the recipient and that is selected from a plurality of aliases identifying the recipient via which the recipient is capable of receiving the file sharing invitation, the first alias corresponding to a first contact channel of a plurality of contact channels of the recipient, the plurality of contact channels corresponding to the plurality of aliases that identify the recipient, wherein the first alias is a first email address, a first phone number, a first gamer tag, or a first telecommunication account name;
based on the file sharing account of the file sender, changing, via an aliasing service associated with the file sharing program, the alias that identify the recipient to which the file is to be sent from the first alias that identifies the recipient to a second alias that identifies the recipient, the second alias that identifies the recipient included in the plurality of aliases that identify the recipient and corresponding to a second contact channel of the recipient, which is included in the plurality of contact channels of the recipient, wherein the second alias is different from the first alias, wherein the second contact channel is different from the first contact channel, and wherein the second alias is a second email address, a second phone number, a second gamer tag, or a second telecommunication account name; and
based on the alias that identifies the recipient to which the file is to be sent being changed from the first alias that identifies the recipient to the second alias that identifies the recipient, sending, via the aliasing service, the file sharing invitation to the second alias that identifies the recipient via the second contact channel of the recipient rather than to the first alias that identifies the recipient via the first contact channel of the recipient.

2. The method of claim 1, further comprising:
determining the second alias that identifies the recipient based on an alias associated with the file sharing account.

3. The method of claim 2, wherein determining the second alias that identifies the recipient comprises:
matching a domain of the alias associated with the file sharing account to a domain of the second alias.

4. The method of claim 1, wherein sending the file sharing invitation comprises:
based on the alias that identifies the recipient to which the file is to be sent being changed from the first alias that identifies the recipient to the second alias that identifies the recipient, automatically sending the file sharing invitation to the second alias that identifies the recipient via the second contact channel of the recipient.

5. The method of claim 1, wherein the second alias that identifies the recipient is an e-mail address, a gamer tag, a flat namespace identifier, a telecommunication application name, or a phone number.

6. The method of claim 1, further comprising:
adding controls to the file sharing invitation;
wherein the file sharing invitation is sent to the second alias that identifies the recipient via the second contact channel in response to the controls being added to the file sharing invitation.

7. A computer readable storage device, which is not a propagating signal, to store computer executable instructions to control a processor to:
receive a file sharing invitation for a recipient from a file sharing account of a file sender, the file sharing account associated with a file sharing program, the file sharing invitation associated with a file uploaded to the file sharing program to be accessed by the recipient via the file sharing invitation, the file sharing invitation indicating that an alias, which identifies the recipient to which the file is to be sent, is a first alias that identifies the recipient and that is selected from a plurality of aliases identifying the recipient via which the recipient is capable of receiving the file sharing invitation, the first alias corresponding to a first contact channel of a plurality of contact channels of the recipient, the plurality of contact channels corresponding to the plurality of aliases that identify the recipient, wherein the first alias is a first email address, a first phone number, a first gamer tag, or a first telecommunication account name;

based on the file sharing account of the file sender, change, via an aliasing service associated with the file sharing program, the alias that identifies the recipient to which the file is to be sent from the first alias that identifies the recipient to a second alias that identifies the recipient, the second alias that identifies the recipient included in the plurality of aliases that identify the recipient and corresponding to a second contact channel of the recipient, which is included in the plurality of contact channels of the recipient, wherein the second alias is different from the first alias, wherein the second contact channel is different from the first contact channel, and wherein the second alias is a second email address, a second phone number, a second gamer tag, or a second telecommunication account name; and based on the alias that identifies the recipient to which the file is to be sent being changed from the first alias that identifies the recipient to the second alias that identifies the recipient, send, via the aliasing service, the file sharing invitation to the second alias that identifies the recipient via the second contact channel of the recipient rather than to the first alias that identifies the recipient via the first contact channel of the recipient.

8. A system, comprising:
a memory device to store a set of instructions; and
a processor to execute the set of instructions to:
receive a file sharing invitation from a file sender account of a file sender, the file sender account associated with a file sharing service, the file sharing invitation associated with a file uploaded to the file sharing service to be accessed by a recipient via the file sharing invitation, the file sharing invitation indicating that an alias, which identifies the recipient to which the file is to be sent, is a first alias that identifies the recipient and that is selected from a plurality of aliases identifying the recipient via which the recipient is capable of receiving the file sharing invitation, the first alias corresponding to a first contact channel of a plurality of contact channels of the recipient, the plurality of contact channels corresponding to the plurality of aliases that identify the recipient, wherein the first alias is a first email address, a first phone number, a first gamer tag, or a first telecommunication account name;

based on the file sender account of the file sender, change, via an aliasing service associated with the file sharing service, the alias that identifies the recipient to which the file is to be sent from the first alias that identifies the recipient to a second alias that identifies the recipient, the second alias that identifies the recipient included in the plurality of aliases that identify the recipient and corresponding to a second contact channel of the recipient, which is included in the plurality of contact channels of the recipient, wherein the second alias is different from the first alias, wherein the second contact channel is different from the first contact channel, and wherein the second alias is a second email address, a second phone number, a second gamer tag, or a second telecommunication account name; and based on the alias that identifies the recipient to which the file is to be sent being changed from the first alias that identifies the recipient to the second alias that identifies the recipient, send, via the aliasing service, the file sharing invitation to the second alias that identifies the recipient via the second contact channel of the recipient rather than to the first alias that identifies the recipient via the first contact channel of the recipient.

9. The system of claim 8, wherein the processor is to execute the set of instructions to provide a notification to the file sender, the notification indicating that the recipient has switched contact channels.

10. The system of claim 8, wherein the processor is to execute the set of instructions to:
determine the second alias that identifies the recipient from the plurality of aliases that identify the recipient based on previous interactions between the file sender and the recipient.

11. The system of claim 8, wherein the processor is to execute the set of instructions to:
determine the second alias that identifies the recipient from the plurality of aliases that identify the recipient based on a comparison of an alias that identifies the file sender and the plurality of aliases that identify the recipient.

12. The system of claim 8, wherein the plurality of aliases that identify the recipient are collected from other services of the recipient.

13. The system of claim 8, wherein the processor is to execute the set of instructions to:
provide a notification to the file sender, the notification indicating that the recipient has accessed the file.

14. The method of claim 1, wherein the plurality of contact channels corresponds to a plurality of respective contact channel types, including at least a first contact channel type and a second contact channel type that is different from the first contact channel type;
wherein the first contact channel corresponds to the first contact channel type; and
wherein the second contact channel corresponds to the second contact channel type.

15. The method of claim 14, wherein the first contact channel corresponds to an email address, and the second contact channel corresponds to a telephone number; or
wherein the first contact channel corresponds to the telephone number, and the second contact channel corresponds to the email address.

16. The method of claim 6, wherein the controls enable the recipient to open the file sharing invitation in in a third contact channel of the recipient, which is different from the second contact channel of the recipient and which is included in the plurality of contact channels of the recipient; and
wherein the third contact channel of the recipient corresponds to a third alias that identifies the recipient that is different from the second alias that identifies the recipient.

17. The system of claim 8, wherein the plurality of contact channels corresponds to a plurality of respective email contact channel subtypes of an email contact channel type, the plurality of email contact channel subtypes corresponding to a plurality of respective email account types;
wherein the first contact channel corresponds to a first email contact channel subtype of the plurality of email contact channel subtypes;
wherein the second contact channel corresponds to a second email contact channel subtype of the plurality of email contact channel subtypes; and wherein the second email contact channel subtype is different from the first email contact channel subtype.

18. The system of claim 8, wherein the processor is to execute the set of instructions to:
determine that the alias that identifies the recipient to which the file is to be sent is to be changed from the first alias that identifies the recipient to the second alias that identifies the recipient based on a nature of the file.

19. The system of claim 8, wherein the processor is to execute the set of instructions to:
determine that the alias that identifies the recipient to which the file is to be sent is to be changed from the first alias that identifies the recipient to the second alias that identifies the recipient based on a hash of the file.

20. The system of claim 8, wherein the processor is to execute the set of instructions to:
change the alias that identifies the recipient to which the file is to be sent from the first alias that identifies the recipient to the second alias that identifies the recipient based on a first alias type of an alias that identifies the file sender corresponding to a second alias type of the second alias that identifies the recipient.

* * * * *